United States Patent
Paalasmaa

(10) Patent No.: US 12,486,884 B2
(45) Date of Patent: Dec. 2, 2025

(54) GEAR TRANSMISSION

(71) Applicant: Neptunus Transmission Oy, Kauniainen (FI)

(72) Inventor: Seppo Paalasmaa, Kauniainen (FI)

(73) Assignee: Neptunus Transmission Oy, Kauniainen (FI)

( * ) Notice: Subject to any disclaimer, the term of this patent is extended or adjusted under 35 U.S.C. 154(b) by 0 days.

(21) Appl. No.: 18/864,917

(22) PCT Filed: May 12, 2023

(86) PCT No.: PCT/FI2023/050260
§ 371 (c)(1),
(2) Date: Nov. 12, 2024

(87) PCT Pub. No.: WO2023/161567
PCT Pub. Date: Aug. 31, 2023

(65) Prior Publication Data
US 2025/0305562 A1    Oct. 2, 2025

(30) Foreign Application Priority Data
May 13, 2022  (FI) ............................... 20225427

(51) Int. Cl.
*F16H 3/74*    (2006.01)
(52) U.S. Cl.
CPC ..................... *F16H 3/74* (2013.01)

(58) Field of Classification Search
CPC ........................................................ F16H 3/74
See application file for complete search history.

(56) References Cited

U.S. PATENT DOCUMENTS

| | | | | |
|---|---|---|---|---|
| 5,316,525 | A | * 5/1994 | O'Keefe | F16H 3/74 475/331 |
| 6,053,840 | A | * 4/2000 | Jones | F16H 3/74 475/248 |
| 2003/0153427 | A1 | * 8/2003 | Mayranen | F16H 3/74 475/331 |
| 2007/0155570 | A1 | 7/2007 | Kimura et al. | |
| 2010/0035717 | A1 | 2/2010 | Tae et al. | |
| 2011/0105269 | A1 | 5/2011 | Sato et al. | |
| 2015/0298536 | A1 | 10/2015 | Märkl et al. | |

FOREIGN PATENT DOCUMENTS

| | | |
|---|---|---|
| EP | 1167818 B1 | 8/2005 |
| EP | 2914876 B1 | 4/2019 |
| JP | 2001021020 A | 1/2001 |

* cited by examiner

*Primary Examiner* — Huan Le
(74) *Attorney, Agent, or Firm* — Espatent Oy

(57) ABSTRACT

A gear transmission with a continuously variable gear ratio, comprising an input part defining an input axis, an output part defining an output axis, the output axis being aligned with the input axis, and a set of gear wheels connecting the input part to the output part, wherein said set of gear wheels is arranged as an input body in contact with the input part and an output body in contact with the output part, and the output body being in gear tooth contact with the input body.

20 Claims, 6 Drawing Sheets

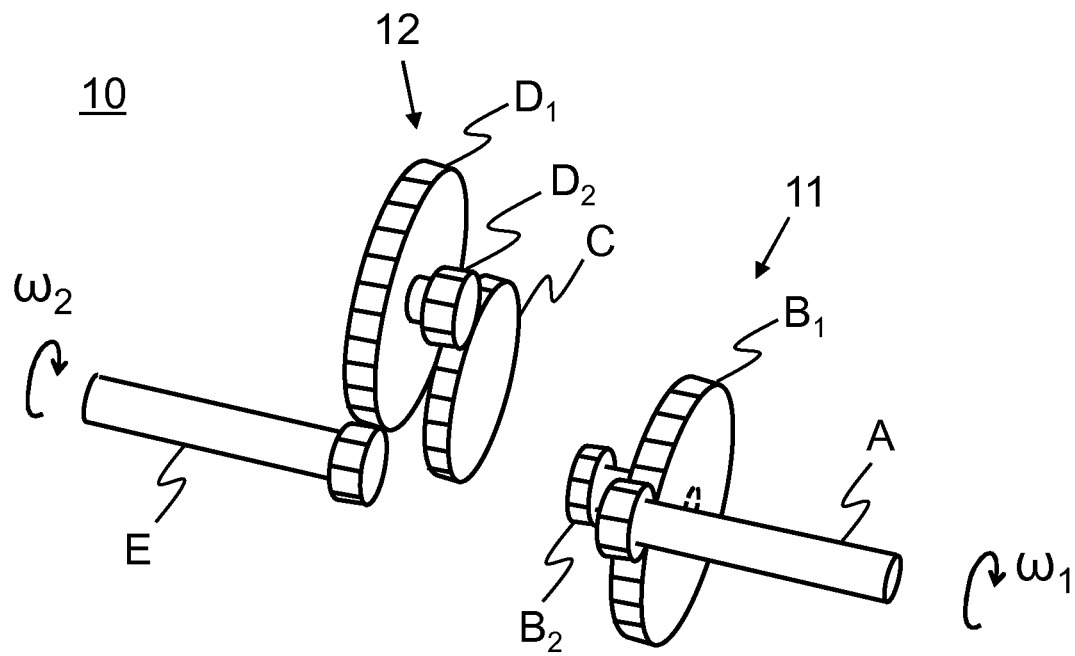
Fig. 1a
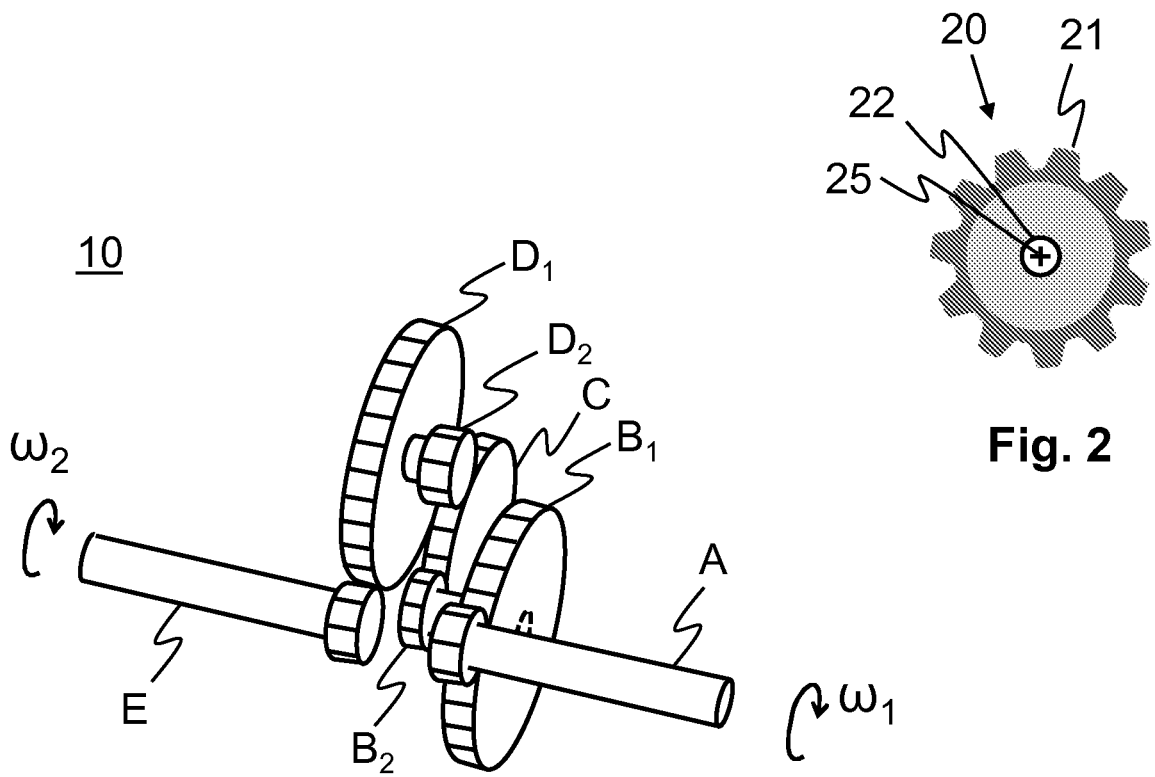
Fig. 1b
Fig. 2

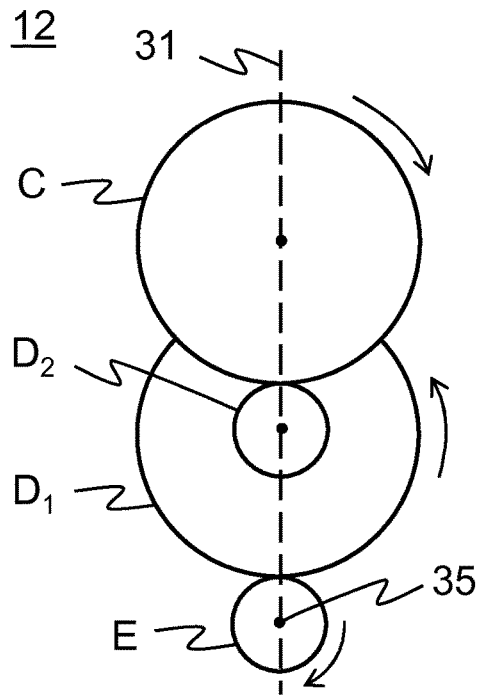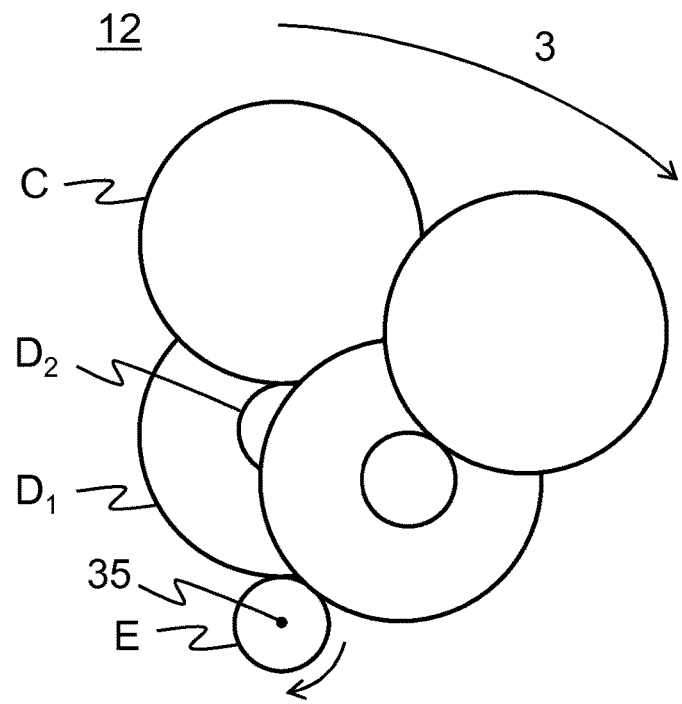
Fig. 3a　　　　　　　　Fig. 3b
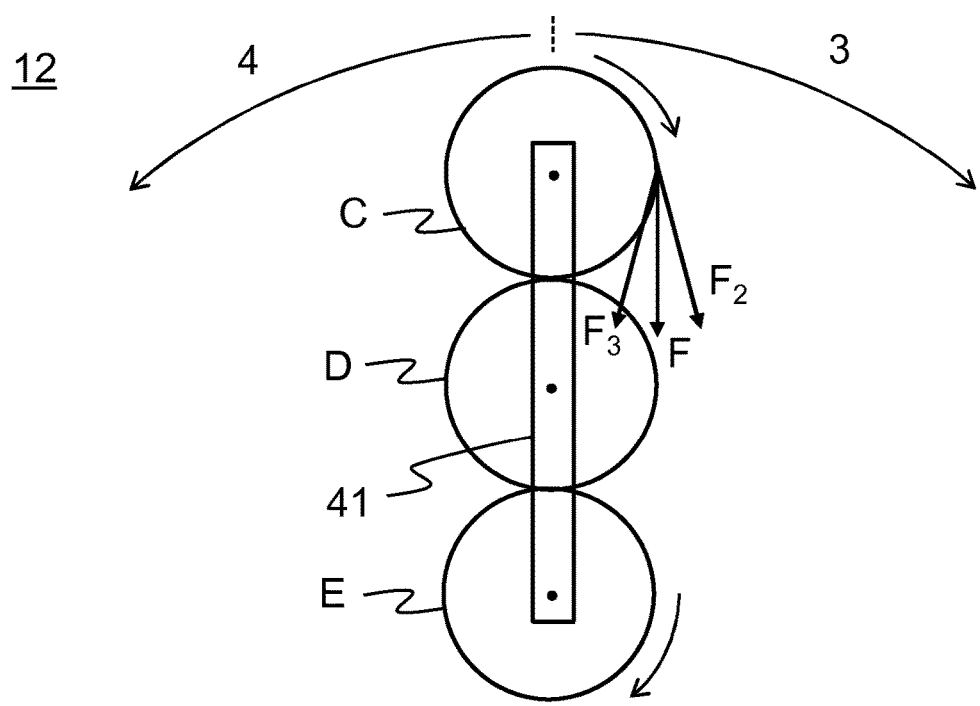
Fig. 4

GEAR TRANSMISSION

TECHNICAL FIELD

The present disclosure generally relates to gear transmissions.

BACKGROUND

This section illustrates useful background information without admission of any technique described herein representative of the state of the art.

A transmission is an apparatus in a power transmission system that provides controlled application of power. The transmission typically uses gears to provide speed and torque conversions from a rotating power source to another device.

Transmissions are commonly used in motor vehicles, where the transmission adapts the output of an engine to drive wheels. Transmissions are also used in bicycles, fixed machines, and wherever rotational speeds and torques need to be adapted.

Depending on the application, there are transmissions with multiple gear ratios, and single-ratio transmissions.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

It is an object of certain embodiments of the invention to provide an improved gear transmission or at least to provide an alternative solution to existing technology.

According to a first example aspect of the invention there is provided a gear transmission with a continuously variable gear ratio, comprising:

an input part defining an input axis;
an output part defining an output axis, the output axis being aligned with the input axis; and
a set of gear wheels connecting the input part to the output part, wherein said set of gear wheels is arranged as an input body in contact with the input part and an output body in contact with the output part, and the output body being in gear tooth contact with the input body, wherein the input body applies a force to the output body the direction of the applied force being towards the input axis and output axis.

In certain embodiments, the gear transmission is configured to provide a friction range covering the direction of the applied force to prevent the gear transmission from rotating as a whole.

In certain embodiments, the output body is configured to receive energy via two different routes, the first route being provided by rotation of the input axis and the second route being provided by rotation of the input part being directly coupled to rotation of the output body rotating as a whole.

In certain embodiments, said gear tooth contact (or its location) is away from the input and output axes (input-output line).

In certain embodiments, the input body and the output body are attached to their surroundings only through the said input and output parts. Accordingly, in certain embodiments, the input body and the output body are unsupported bodies. Accordingly, in certain embodiments, the input body and the output body being unsupported is understood to mean that the input body and the output body are not fixed to a surrounding structure (are able to freely rotate as a whole). For example, in certain embodiments, the input body and output body are implemented without brake connections or similar. In other embodiments, even in the event the gear transmission is provided with an optional braking system, the braking system allows the input body and the output body as a whole to freely rotate around a (common) rotation axis.

In certain embodiments, the input part is in the form of a shaft or similar, or in the form capable of receiving a shaft or similar. Respectively, in certain embodiments, the output part is in the form of a shaft or similar, or in the form capable of receiving a shaft or similar.

In certain embodiments, the gear transmission during use automatically strives to conform the rotational speed of the output part to the rotational speed of the input part. Accordingly, in certain embodiments, the gear transmission automatically adjusts to its load.

In certain embodiments, the output body provides two different routes for a received energy to propagate. In certain embodiments, during use, the received rotational energy as received from the input body propagates within the output body via at least one of the two routes. In certain embodiments, a first route is provided via the rotation of a plurality of gear wheels within the output body (the energy thus propagating in accordance with the gear ratio provided by the involved rotating gear wheels of the output body), and a second route is provided via the whole output body rotating around the output axis (gear ratio 1:1). When the received energy propagates via the first route only, the output body as a whole does not rotate around the output axis (i.e. an associated output body holder remains stationary). When the received energy propagates via both routes, the output body rotates almost at the speed of the output part and additional energy is transferred via the gear ratio (e.g., gear ratio 3:1) of the output body.

In certain embodiments, during a first balanced state, energy substantially propagates via the second route only. Upon a change in load, energy begins to propagate also via the gear ratio (first route) until a second balanced state is achieved. In this second balanced state the rotational speed of the input part and the output part is typically different from the rotational speed in the first balanced state.

In certain embodiments, in the event of an increase in load, the gear transmission increases energy transfer via the first route.

In certain embodiments, when the load decreases in a situation in which energy is being transferred via both routes, the gear transmission decreases energy transfer via the first route (approaches to gear ratio 1:1)

In certain embodiments, in a situation in which the gear transmission initially is stationary (i.e. does not move) and begins to move (e.g., if the gear transmission is in a vehicle that is starting to move), the energy propagates first via the first route only. And, after the movement has begun, the gear transmission (if there is enough input power) decreases energy transfer via the first route (strives towards the gear ratio 1:1).

In certain embodiments, at said gear tooth contact the input body applies a force to the output body towards a first direction, the direction of the force in the first direction being such that it allows rotation of the output body without an output body holder being rotated around the output axis.

In certain embodiments, the first direction is obtained by selecting a desired gear ratio for the output body. In certain embodiments, the gear wheels of output body are attached (e.g. via bearings) to the output body holder. In certain embodiments, the output body holder is L-shaped.

In certain embodiments, the gear transmission provides a zero-force direction at said gear tooth contact causing the holder to rotate at no direction, and wherein the first direction is within a predetermined friction range with respect to the zero-force direction.

In certain embodiments, the input body applies a force to the output body the direction of the applied force being towards the input-output axis. Accordingly, in certain embodiments, the first direction points towards the output axis. In certain embodiments, the zero-force direction generally points close to the output axis and has an offset from the output axis. In certain embodiments, the first direction points closer to the output axis that the zero-force direction does.

In certain embodiments, the input body comprises at least one gear wheel or a plurality of gear wheels. In certain embodiments, the input body comprises concentric gear wheels. In certain embodiments, the output body comprises concentric gear wheels.

In certain embodiments, the gear transmission comprises two concentric gear wheels in the input body rigidly attached to each other and two concentric gear wheels in the output body rigidly attached to each, and a gear wheel that is non-concentric with both the two gear wheels of the input body and the two gear wheels of the output body connecting the two concentric gear wheels in the input body and the two concentric gear wheels in the output body. In certain embodiments, the connecting gear wheel forms part of the output body.

In certain embodiments, one of the two concentric gear wheels in the input body contact the input part, one of the two concentric gear wheels in the output body contact the output part, and the other of the two concentric gear wheels in the input body, and in the output body, respectively, contact the non-concentric gear wheel.

In certain embodiments, the concentric gear wheels of the input body comprise a first gear wheel ($B_1$) and a second gear wheel ($B_2$) rigidly attached to the first gear wheel ($B_1$). In certain embodiments, the number of teeth in the second gear wheel ($B_2$) is less than the number of teeth in the first gear wheel ($B_1$). In certain embodiments, the first (bigger) gear wheel ($B_1$) contacts the input part (or axis).

In certain embodiments, the concentric gear wheels of the output body comprise a first gear wheel ($D_1$), and a second gear wheel ($D_2$) rigidly attached to the first gear wheel ($D_1$). In certain embodiments, the number of teeth in the second gear wheel ($D_2$) is less than the number of teeth in the first gear wheel ($D_1$). In certain embodiments, the first (bigger) gear wheel ($D_1$) contacts the output part (or axis).

In certain embodiments, the output body is in gear tooth contact with the input body through a third gear wheel (C). In certain embodiments, the third gear wheel (C) is comprised by the output body. In certain embodiments, the third gear wheel (C) is non-concentric with the first gear wheel ($D_1$) and the second gear wheel ($D_2$) of the output body. In certain embodiments, the third gear wheel (C) is non-concentric with the first gear wheel ($B_1$) and the second gear wheel ($B_2$) of the input body.

In certain embodiments, the third gear wheel (C) is positioned in between the second gear wheel ($D_2$) of the output body and the second gear wheel ($B_2$) of the input body.

In certain embodiments, the third gear wheel (C) is in gear tooth contact with both the second gear wheel ($D_2$) of the output body and the second gear wheel ($B_2$) of the input body.

In certain embodiments, the input part (of shaft) is in gear tooth contact with the input body. In certain embodiments, the output part (or shaft) is in gear tooth contact with the output body. In certain embodiments, the input part comprises an input shaft in gear tooth contact with the first gear wheel ($B_1$) of the input body. In certain embodiments, the output part comprises an output shaft in gear tooth contact with the first gear wheel ($D_1$) of the output body.

In certain embodiments, the various gear tooth contacts mentioned herein occur at the perimeter of the gear wheels concerned.

In certain embodiments, the gear transmission comprises a decreasing gear ratio in the input body and an increasing gear ratio in the output body so that the gear transmission as a whole is a reduction gear.

According to a second example aspect of the invention there is provided a power transmission apparatus comprising the gear transmission of the first aspect or any of its embodiments.

In certain embodiments, the power transmission apparatus is a vehicle, such as a motor vehicle or a bicycle, a fixed machine, a hand tool, a power tool, or any other apparatus that requires rotational speeds and torques to be adapted.

According to a yet further aspect there is provided a gear transmission with a continuously variable gear ratio, comprising:
  an input part defining an input axis;
  an output part defining an output axis, the output axis being aligned with the input axis; and
  a set of gear wheels connecting the input part to the output part, wherein said set of gear wheels is arranged as an (optionally unsupported) input body in contact with the input part and an (optionally unsupported) output body in contact with the output part, and the output body being in gear tooth contact with the input body.

All embodiments of the first aspect are applicable to this further aspect.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments apply to other example aspects as well.

BRIEF DESCRIPTION OF THE FIGURES

Some example embodiments will be described with reference to the accompanying figures, in which:

FIG. 1a shows a schematic perspective view of parts of a gear transmission with a continuously variable gear ratio according to certain example embodiments;

FIG. 1b shows the gear transmission of FIG. 1 as assembled according to certain example embodiments;

FIG. 2 schematically shows certain parts of a gear wheel;

FIG. 3a shows operation of an output body according to certain example embodiments;

FIG. 3b shows further operation of the output body according to certain example embodiments;

FIG. 4 shows a correlation of the direction of applied force with the rotation direction of the output body;

DETAILED DESCRIPTION

Figure 5:
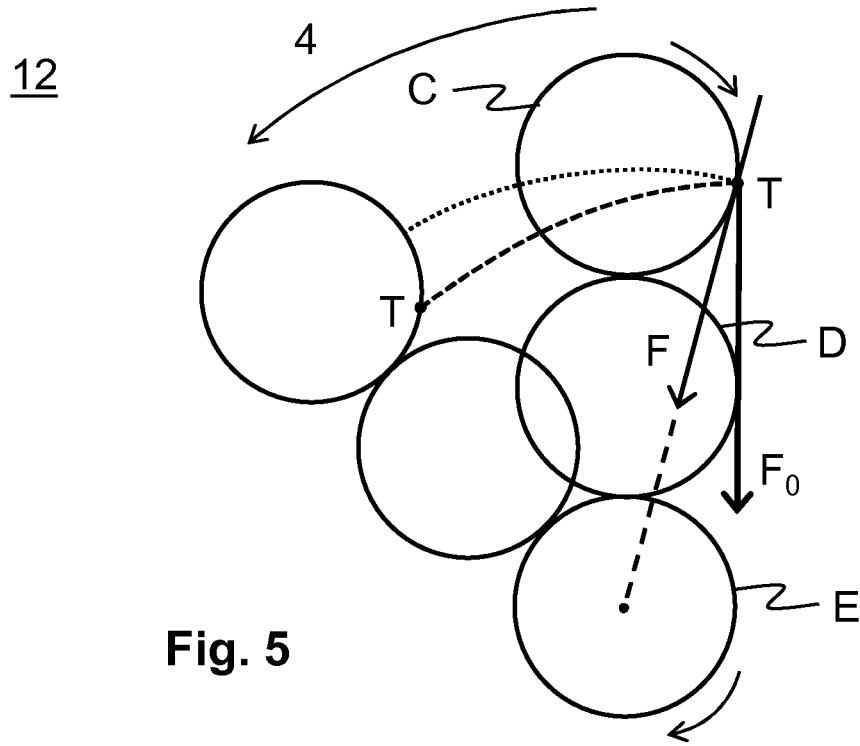
FIG. 5 shows a schematic illustration of a trajectory of a certain tooth in a non-optimal case scenario.

In the following description, like reference signs denote like elements or steps.

FIG. 1a shows a schematic perspective view of parts of a gear transmission with a continuously variable gear ratio according to certain example embodiments. The gear transmission comprises an input part A defining an input axis. The gear transmission further comprises an output part E defining an output axis. The output axis is aligned with the input axis (meaning that the rotation axes are the same, i.e., the output axis lies on a linear continuation of the input axis). In certain embodiments, the input part A is in the form of a shaft. In certain embodiments, the input part shaft has a toothed end. The toothed end of the input part (shaft) A may be in the form of a gear wheel. In certain embodiments, the output part E is in the form of a shaft. In certain embodiments, the output part shaft has a toothed end. The toothed end of the output part (shaft) E may be in the form of a gear wheel.

The gear transmission further comprises a set of gear wheels connecting the input part A to the output part E. The set of gear wheels is arranged as an input body 11 and as an output body 12. In certain embodiments, the input body 11 and the output body 12 are separate parts as shown in FIG. 1a. During operation, as shown in FIG. 1b, the input body 11 and the output body 12 are in gear tooth contact.

In certain embodiments, the input body 11 comprises two concentric gear wheels $B_1$, $B_2$ rigidly attached to each other. The gear wheels $B_1$, $B_2$ have an axial separation, and have a common rotation axis. In certain embodiments, the gear wheel $B_1$ which is the bigger one of the gear wheels $B_1$, $B_2$ (and has a bigger number of teeth) is in gear tooth contact with the input part A (or its toothed end/gear wheel). Thus, when the input part A rotates around its rotation axis (input axis) at an angular velocity $\omega_1$, the gear wheels $B_1$ and $B_2$ rotate in an opposite direction compared with the direction of rotation of the input part A.

In certain embodiments, the output body 12 comprises two concentric gear wheels $D_1$, $D_2$ rigidly attached to each other. The gear wheels $D_1$, $D_2$ have an axial separation, and have a common rotation axis. In certain embodiments, the gear wheel $D_1$ which is the bigger one of the gear wheels $D_1$, $D_2$ (and has a bigger number of teeth) is in gear tooth contact with the output part E (or its toothed end/gear wheel). When the gear wheels $D_1$ and $D_2$ rotate, they rotate at the same angular velocity. Further, the output body comprises a third gear wheel C which is non-concentric with the gear wheels $D_1$ and $D_2$. The third gear wheel C is in tooth contact with the smaller gear wheel $D_2$. Further, the third gear wheel C is in tooth contact with the input body 11 (FIG. 1b). In certain embodiments, as shown in FIG. 1b, the tooth contact with the input body 11 is provided as a tooth contact of the third gear wheel C with the smaller gear wheel $B_2$.

The purpose of the input body 11 is to transfer rotational energy to the output body 12. Once the input part A rotates, the input body 11 applies a force F (see FIGS. 4-6 for more detail) to the output body 12 causing the output body to rotate. In practice, a rotating (outer) gear wheel of the input body 11 causes a gear wheel of the outer body 12 to rotate. In the embodiment shown in FIG. 1, this occurs as follows: the rotating gear wheel $B_2$ is in gear tooth contact with the gear wheel C and transfers rotational energy to the gear wheel C. Within the output body 12, the gear wheel C in gear tooth contact with gear wheel $D_2$ causes rotation of the gear wheels $D_2$ and $D_1$. The gear wheel $D_1$ being in gear tooth contact with the output part E causes the output part E to rotate around its rotation axis (output axis) at an angular velocity $\omega_2$.

The gear wheels described in the foregoing may be of the general form shown in FIG. 2. The general form of a gear wheel 20 comprises a wheel having a predefined number of teeth 21 at its circumference. Further, the gear wheel 20 is provided with a bearing 22 or similar allowing the gear wheel to rotate around its rotation axis 25.

As mentioned in the preceding, the purpose of the input body 11 is to transfer rotational energy to the output body 12. In the example embodiments shown in FIGS. 1a and 1b, the rotational energy transferred by the input body 11 is received at the circumference of the third gear wheel C of the output body 12. Accordingly, the input body 11 applies a force F (see FIGS. 4-6 for more detail) to the output body 12 causing the output body 12 and the output part E to rotate.

The received energy propagates within the output body 12 via at least one of two routes. FIGS. 3a and 3b show these routes. For the sake of clarity, the parts (gear wheels) C, $D_1$, $D_2$, and E have been drawn so that their rotation axes are parallel each residing in one and the same radial plane 31 of the rotation axis (output axis 35) of the output part E. However, what is described in the following will apply also in the case shown in FIGS. 1a and 1b in which the rotational axes of C, $D_1/D_2$, and E are not mutually similarly aligned with a straight line.

When energy propagates via a first route, this occurs via the rotation of the various gear wheels (here: gear wheels C, $D_1$, and $D_2$) of the output body 12 as described in connection with FIGS. 1a and 1b. Accordingly, energy propagates in accordance with the gear ratio provided by the involved rotating gear wheels of the output body 12. FIG. 3a represents this route.

The second route is implemented through the whole output body 12 rotating around the output axis 35 (illustrated by arrow 3 in FIG. 3b). The second route provides the gear ratio 1:1 as the input part A and the output part E (as well as the input body 11 and the output body 12) rotate at the same angular velocity $\omega_1 = \omega_2$.

In principle, the propagation of energy via only one of the two disclosed routes represents two extremities of the gear ratio provided by the gear transmission, the gear ratio 1:1 being the other extremity and the gear ratio provided by the first route (e.g. 3:1) being the other extremity.

In certain practical embodiments, the angular velocity $\omega_2$ of the output part E is somewhat lower than the angular velocity $\omega_1$ of the input part A, and the energy propagates via both of the two disclosed routes.

It has been observed that the direction of force F that the input body 11 applies to the output body 12 is of importance for the operation of the disclosed gear transmission. To elaborate importance of the direction of force F in general, FIG. 4 shows a simplified drawing of the output body 12 in which the gear wheels $D_1$, and $D_2$ have been replaced by a single gear wheel D and each of the gear wheels C, D, and E have the same diameter (and same number of teeth). Each of the gear wheels C, D, E have been attached to a holder 41 by appropriate bearings.

In the example scenario of FIG. 4, the input body 11 (not shown in FIG. 4) directs a force F to the gear wheel C. If effects of friction are neglected, the direction of the force F directed straight downwards causes the output part E to rotate in a desired direction (here: clockwise), but the holder 41 does not rotate. This direction is denoted as the zero-force ($F_0$) direction in the following description. If the direction of force is further left (as shown by force $F_2$), the force causes the output part E to rotate in a desired direction and also the holder 41 to rotate clockwise (as illustrated by arrow 3). However, if the direction of force is further right (as shown by force $F_3$), the force causes the output part E to rotate in a desired direction but the holder 41 to rotate counterclockwise i.e. in an undesired direction (as illustrated by arrow 4). The direction of applied force therefore affects the rotation direction of the holder 41.

Further, it has been observed that in the gear transmission of the described type it is advantageous if the direction of the force F is towards or close to the input-output axis line (the input axis being aligned with the output axis). This cannot be achieved by the construction shown in FIG. 4, since directing the force close to the center point of gear wheel E would cause the output body to rotate in an undesired direction.

Yet further, as shown in FIG. 5, the trajectory of an individual tooth T to which the force F is applied in the construction of FIG. 4 is rather steep, promoting rotation of the whole output body 12 into the undesired direction 4. In FIG. 5 the trajectory of the tooth T is shown by a dashed line, and the circumference of a circle centered at the rotation axis of the output part (output axis) E is shown by a dotted line.

FIG. 5 also shows the zero-force direction $F_0$. It is noted that the force F is quite far from the zero-force direction.

It has been found that the construction of the type shown in FIGS. 1a and 1b where there are gear wheels of different size within the output body 12 (so that the output body 12 provides for a gear ratio different from 1:1) is advantageous with respect to the above.

Figure 6:
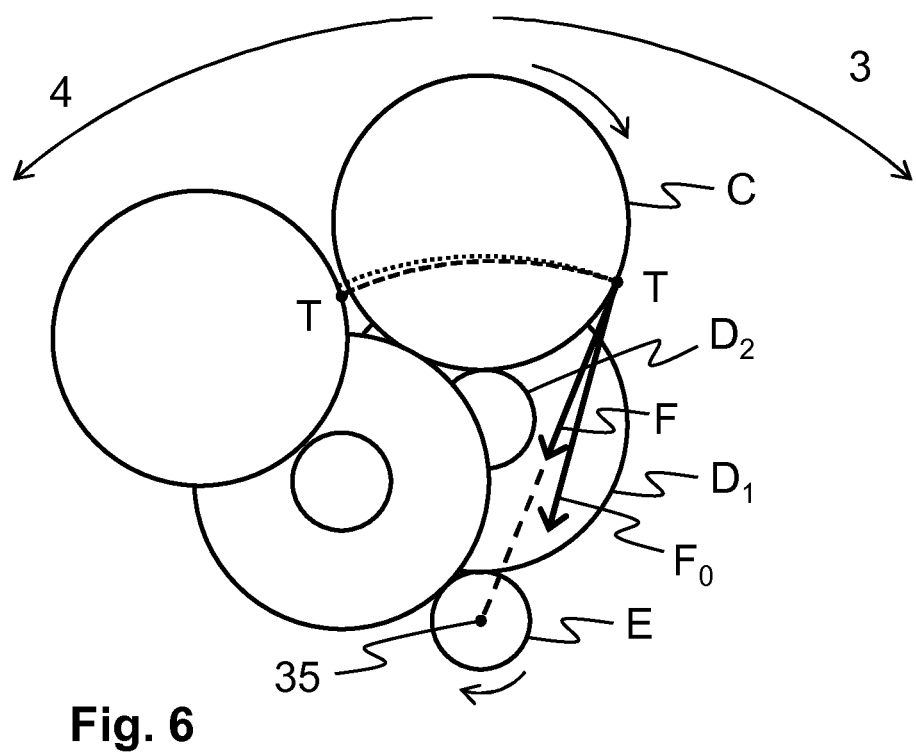
FIG. 6 shows a schematic illustration of a trajectory of a certain tooth in an optimal case scenario according to certain example embodiments.

FIG. 6 shows a schematic illustration of a trajectory of the tooth T in one optimal case scenario according to certain example embodiments. The axes of the various gear wheels C, $D_1$, $D_2$ and E of the output body 12 have been positioned so that they are mutually aligned with a straight line. However, in other embodiments, this is not necessary but the axes of the various gear wheels C, $D_1$, $D_2$ and E of the output body 12 may be positioned so that they are not mutually aligned with a straight line. Accordingly, the positioning of the gear wheels may be arranged in a similar manner as shown in FIGS. 1a and 1b.

However, independently of the used construction of gear wheels, the direction of the force F applied by the input body 11 (or gear wheel $B_2$) to the tooth of the gear wheel C in contact with the input body 11 (or in contact with a respective tooth of the gear wheel $B_2$) points towards the output part E, more advantageously towards or close to the input-output axis line (output axis 35).

One could assume based on what has been presented in connection with FIG. 4 that directing the force F as shown in FIG. 6 would cause the output body 12 to rotate in an undesired direction 4. However, surprisingly this is not the case, but the output body 12 in fact rotates in the desired direction 3 (or the output part E rotates, and the output body 12 does not rotate over its rotation axis at all, i.e., the output body holder 41 that is not shown in FIG. 6 remains stationary). It is noted that the direction of force F is rather close to the zero-force direction.

The trajectory of the individual tooth T to which the force F is applied in the construction of FIG. 6 almost follows the circumference of the circle centered at the rotation axis 35 of the output part (output axis) E, promoting rotation of the whole output body 12 into the desired direction 3 (and preventing rotation of the output body into the undesired direction 4 when the force F is directed towards or close to the input-output axis line). The trajectory of the tooth T (in the event the output body would rotate in the undesired direction 4) is shown in FIG. 6 by a dashed line, and the circumference of the circle centered at the rotation axis 35 of the output part (output axis) E is shown by a dotted line.

In certain embodiments, the gear transmission 10 functions as a reduction gear. In those embodiments, the gear ratio of the input part 11 is selected large enough by suitable dimensioning of the gear wheels of the input part so that the gear transmission as a whole functions as a reduction gear.

Figure 7:
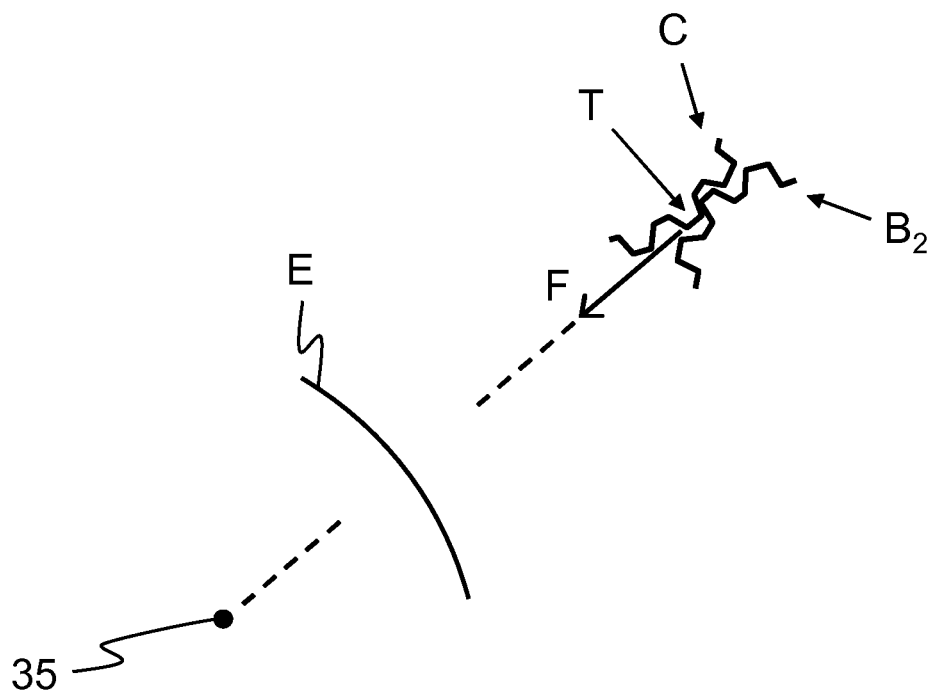
FIG. 7 shows a schematic magnified view at a point of tooth contact according to certain example embodiments.

FIG. 7 shows a schematic magnified view at a point of tooth contact at which a respective tooth of the gear wheel $B_2$ contacts the tooth T of the third gear wheel C. The resulting force F points towards (or close to) the input-output axis line (center point 35 of the gear wheel E).

Figure 8:
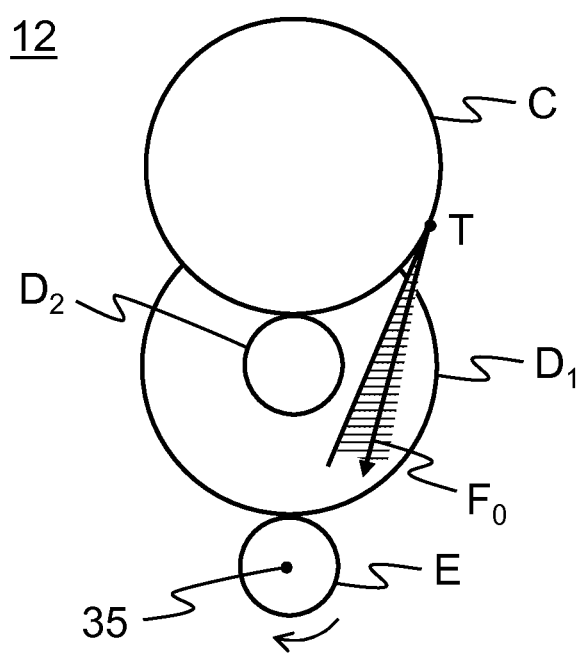
FIG. 8 shows a margin in a pointing direction of applied force according to certain example embodiments.

It has been observed that in certain embodiments, such as in those shown in FIGS. 1a, 1b, and 6, it is not necessary for the proper functioning of the gear transmission that the direction of force applied by the input body to the output body is exactly the zero-force direction $F_0$, but there is a certain acceptable margin (friction range) due to internal friction of the gear transmission. The size of margin depends on the friction that is specific to each particular embodiment. The shaded area in FIG. 8 shows a schematic example of an acceptable predetermined friction range with respect to the zero-force direction $F_0$. It is advantageous for proper functioning of the gear transmission that the applied force stays within the friction range (so that the energy received by the output body can advantageously be transferred via both mentioned routes). In some embodiments, it is adequate if the applied force simply points towards the output part E.

The zero-force direction and the direction of force applied by the input body to the output body can be adjusted close to each other by designing the gear ratios of the output and/or input bodies. FIGS. 1a, 1b and 6 show only some possible embodiments. However, in view of the present description, a multitude of other suitable geometries of the input body and/or the output body with suitable gear ratios can be found. For example, the number of gear wheels within the input body may be different depending on the embodiment. The number of gear wheels may be for example 4 or 6 in the event a greater gear ratio is desired in the input body.

Figure 9:
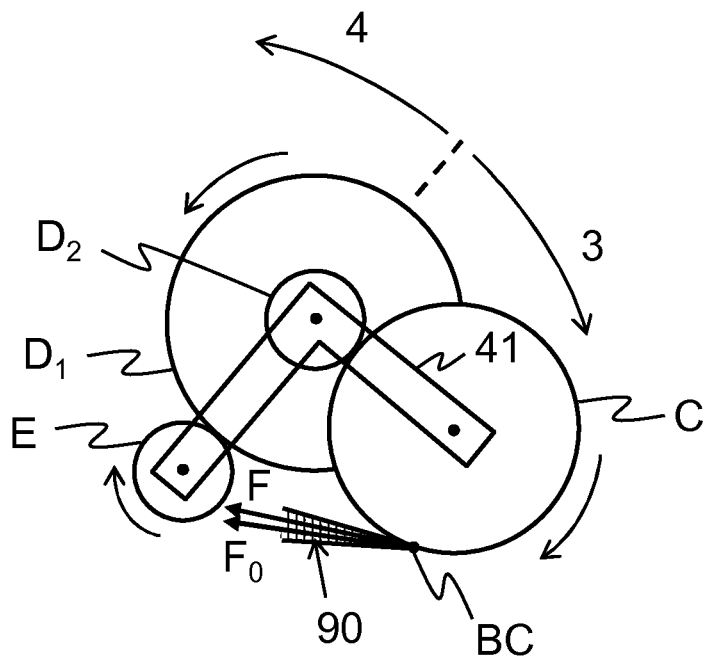
FIG. 9 shows the output body together with an output body holder according to certain example embodiments.

FIG. 9 shows one applicable geometry for the output body comprising an L-shaped output body holder 41 to which the various gear wheels C, $D_1$, $D_2$, and E have been attached e.g. with suitable bearings. The gear wheels shown in FIGS. 1a and 1b can be attached to holder(s) in a corresponding manner. The reference sign BC denotes the point of tooth contact at which the input body (a respective tooth of the gear wheel $B_2$ or similar) contacts the third gear wheel C, and the reference sign 90 schematically denotes the friction range. As mentioned, it is advantageous for proper functioning of the gear transmission 100 that the applied force F stays within the friction range 90, which is the case in the embodiments shown in FIG. 9.

As mentioned the received energy (energy received by the output body 12 via the point BC) propagates within the output body 12 via one or two routes, the first route occurring via the rotation of the various gear wheels (here: gear wheels C, $D_1$, and $D_2$) and the second route via the output body 12 rotating as a whole.

In certain embodiments, in a situation in which the gear transmission initially is stationary (i.e. does not move) and begins to move (e.g., if the gear transmission is in a vehicle that is starting to move), the energy propagates first via the first route only. And, after the movement has begun, the gear transmission (if there is enough input power) decreases energy transfer via the first route (strives towards the gear ratio 1:1).

In certain embodiments, in the event of an increase in load, the gear transmission increases energy transfer via the first route.

In certain embodiments, when the load decreases in a situation in which energy is being transferred via both routes, the gear transmission decreases energy transfer via the first route (approaches to gear ratio 1:1).

The gear transmission of the disclosed embodiments provides a continuously variable gear ratio due to the rotational energy propagating within the output body 12 via said two routes. The amount of rotational energy propagating along each route defines the gear ratio at each moment in time.

Further, the gear transmission automatically strives to conform the rotational speed (angular velocity) of the output part E to the rotational speed of the input part A. The gear transmission does not recognize absolute rotational speeds, but continuously adjusts itself to its load, depending on the load and on the rotational speed at each time.

In embodiments of the invention, the gear transmission is attached to its external environment via the input and output axes only. Accordingly, the gear transmission for example is implemented without brake connections to any housing accommodating the gear transmission. However, an optional braking system that allows the input body and the output body as a whole to freely rotate around a (common) rotation axis when not in use may be provided in some cases.

Figure 10:
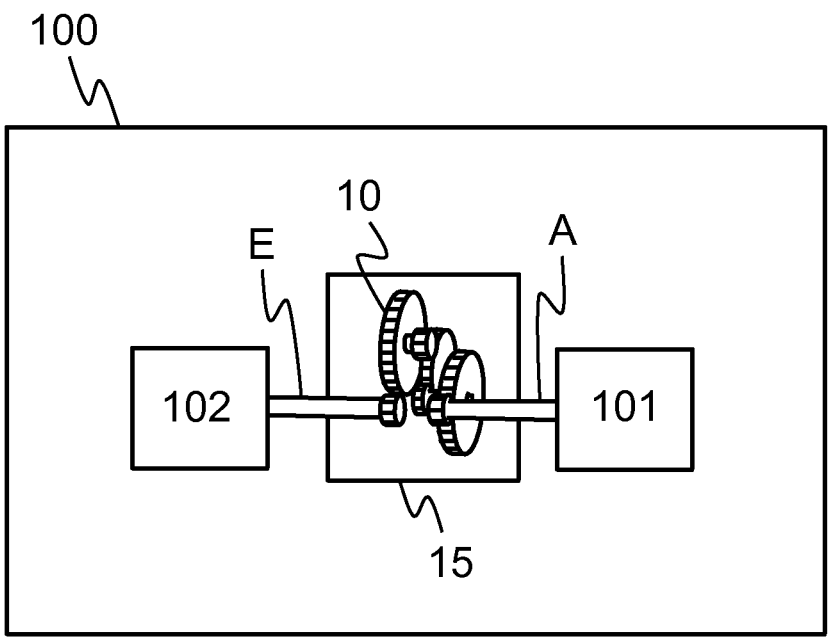
FIG. 10 shows a schematic representation of an apparatus comprising the gear transmission with a continuously variable gear ratio according to certain example embodiments.

FIG. 10 shows a schematic representation of an apparatus comprising the gear transmission with a continuously variable gear ratio according to certain example embodiments. The apparatus 100 comprises a source of rotational energy 101 and a load 102. The rotational energy is transmitted via the gear transmission 10 housed by a housing 15 to the load 102. The gear transmission receives the rotational energy via the input part A and transmits rotational energy, after having performed appropriate speed/torque adaptations to the load 102 via the output part E.

The shown apparatus 100 may be a vehicle, such as a motor vehicle or a bicycle, a fixed machine, a hand tool, a power tool or any other apparatus that requires rotational speeds and torques to be adapted.

Figure 11:
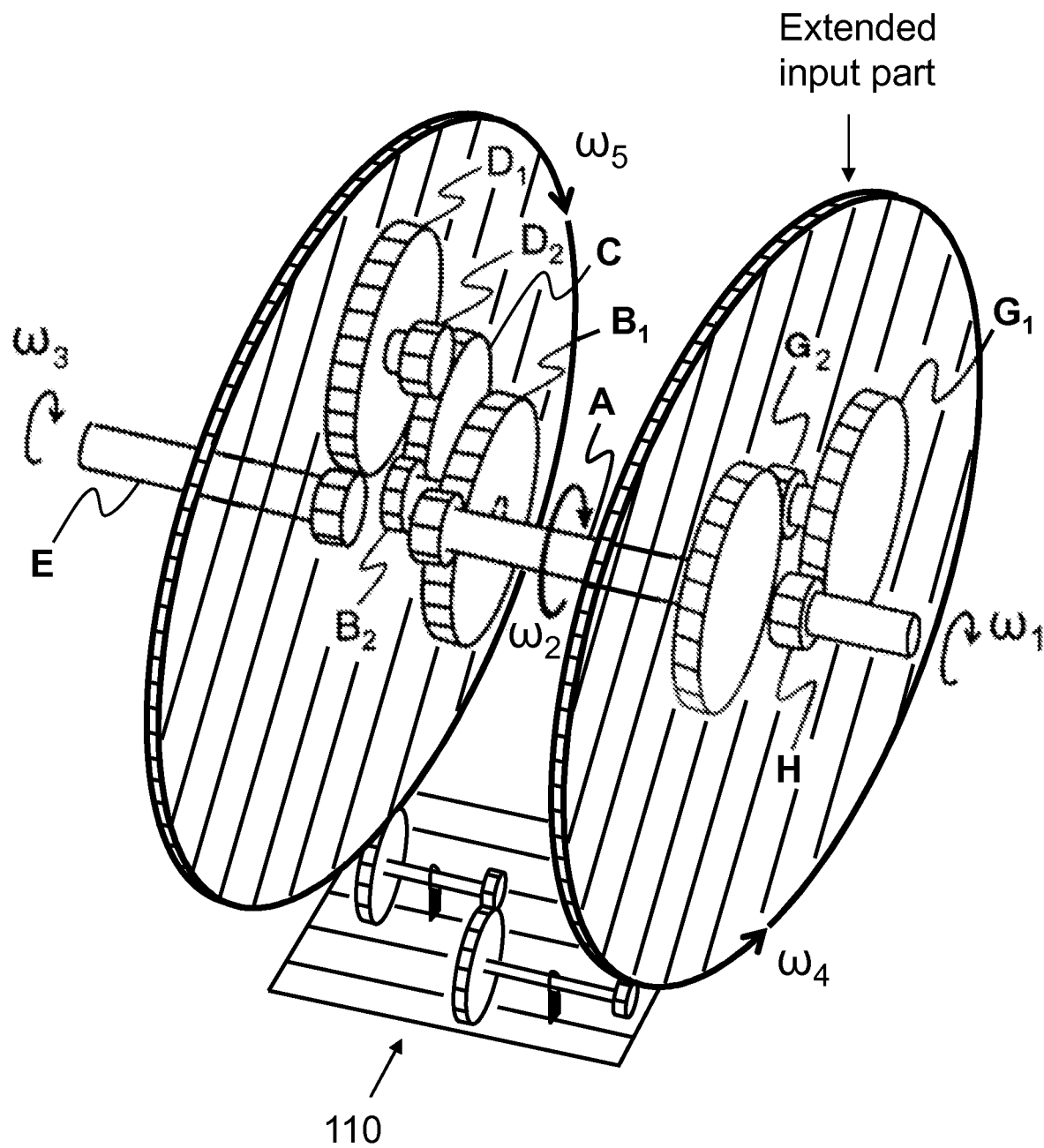
FIG. 11 shows a gear transmission with a continuously variable gear ratio according to yet further embodiments.

FIG. 11 shows a further embodiment. The embodiment shown in FIG. 11 otherwise corresponds to embodiments shown in the preceding except that the gear transmission 10' of FIG. 11 comprises a further route to transfer energy.

The gear transmission 10' comprises the input part A defining the input axis. The gear transmission 10' further comprises the output part E defining the output axis. The output axis is aligned with the input axis.

The gear transmission 10' further comprises the set of gear wheels connecting the input part A to the output part E. The set of gear wheels is arranged as the input body and output body. The input body and the output body are in gear tooth contact, wherein the input body applies a force to the output body the direction of the applied force being towards the input axis and output axis. In certain embodiments, the gear transmission 10' is configured to provide a friction range covering the direction of the applied force to prevent the gear transmission 10' from rotating as a whole.

The input part A is extended such that the input part A not only defines the input axis but also comprises a set of gear wheels, as an example the gear wheels $G_1$, $G_2$ and H. In certain embodiments, the gear wheels $G_1$ and $G_2$ are concentric gear wheels rigidly attached to each other. The input part A comprises the shaft having the toothed end in gear tooth contact with the gear wheel $B_2$. The opposite end of the shaft is in the form of a gear wheel that is in gear tooth contact with gear wheel $G_2$. The gear wheel H forms an end or a second input shaft aligned with the input shaft described in the preceding. The gear wheel H is in gear tooth contact with the gear wheel $G_1$.

In certain embodiments, the output body is configured to receive energy via two different routes, the first route being provided by rotation of the input axis (angular velocity at different points being marked by $\omega_1$, $\omega_2$, and $\omega_3$) and the second route being provided by rotation of the extended input part (rotating as a whole around the input axis) being directly coupled to rotation of the output body (rotating as a whole around the output axis). The second route is illustrated by hatchings in FIG. 11. Accordingly, in FIG. 11 the extended input part is coupled by a rotational coupler 110 to the output body. The rotational coupler 110 fixes the angular velocity $\omega_5$ of the (whole) output body (around the output axis) with the angular velocity $\omega_4$ of the (whole) extended input part (around the input axis). In certain embodiments, $\omega_4 = \omega_5$ due to the rotational coupler 110.

In certain embodiments, the gear transmission 10' (and the gear transmission 10 shown in FIG. 1b) comprises a locking feature. Accordingly, when the output part or axis E rotates and there is no power incoming through the input (part or axis), the input and output bodies rotate at same angular velocity. And conversely, when the input and output bodies rotate, also the output part or axis E rotates.

It is to be noted that only one schematical example of the coupling is shown with a set of gear wheels in FIG. 11. Other implementations are possible in other embodiments. Furthermore, the number and mutual arrangement of the gear wheels of the extended input part may vary depending on the embodiment.

In certain embodiments, it is preferable to retain the gear ratio of the part of the gear transmission 10' corresponding to the gear transmission 10 of FIG. 1b close to the gear ratio 1:1 and to obtain a greater or smaller gear ratio with the aid of the extended input part of FIG. 11. In certain embodiments, this arrangement contributes to an improvement of an overall efficiency of the gear transmission 10'.

In yet further embodiments, electrical operation of the gear transmission is implemented, instead of mere mechanical operation. In such embodiments, a stator and a rotor may be implemented within the gear transmission for example by positioning a permanent magnet or an electromagnet at the center point 35 of the input-output axis line (stator) and positioning a counterpart magnet at the point of the tooth T of the third gear wheel C (rotor). The operation of such gear transmissions corresponds to the operation of the mechanical embodiments, except that the force applied to the point T is obtained through electromagnetism.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A gear transmission with a continuously variable gear ratio, comprising:
   an input part defining an input axis;
   an output part defining an output axis, the output axis being aligned with the input axis; and
   a set of gear wheels connecting the input part to the output part, wherein said set of gear wheels is arranged as an input body in contact with the input part and an output body in contact with the output part, and the output body being in gear tooth contact with the input body, wherein the input body applies a force to the output body in a direction towards the input axis and output axis.

2. The gear transmission of claim 1, configured to provide a friction range covering the direction of the applied force to prevent the gear transmission from rotating as a whole.

3. The gear transmission of claim 2, wherein the output body is configured to receive energy via two different routes, the first route being provided by rotation of the input axis and the second route being provided by rotation of the input part being directly coupled to rotation of the output body rotating as a whole.

4. The gear transmission of claim 2, wherein the input body and the output body are attached to their surroundings only through the said input and output parts.

5. The gear transmission of claim 1, wherein the output body is configured to receive energy via two different routes, the first route being provided by rotation of the input axis and the second route being provided by rotation of the input part being directly coupled to rotation of the output body rotating as a whole.

6. The gear transmission of claim 5, wherein the input body and the output body are attached to their surroundings only through the said input and output parts.

7. The gear transmission of claim 5, wherein the output body provides two different routes for a received energy to propagate.

8. The gear transmission of claim 7, wherein a first route is provided via the rotation of a plurality of gear wheels within the output body, and a second route is provided via the whole output body rotating around the output axis.

9. The gear transmission of claim 1, wherein the input body and the output body are attached to their surroundings only through the said input and output parts.

10. The gear transmission of claim 1, wherein the gear transmission during use automatically strives to conform a rotational speed of the output part to the rotational speed of the input part.

11. The gear transmission of claim 1, wherein the output body provides two different routes for a received energy to propagate.

12. The gear transmission of claim 11, wherein a first route is provided via the rotation of a plurality of gear wheels within the output body, and a second route is provided via the output body rotating around the output axis.

13. The gear transmission of claim 1, wherein at said gear tooth contact the input body applies a force to the output body towards a second direction, the direction of the force in the second direction being such that it allows rotation of the output body without an output body holder being rotated around the output axis.

14. The gear transmission of claim 13, wherein the gear transmission provides a zero-force direction at said gear tooth contact causing the holder to rotate at no direction, and wherein the second direction is within a predetermined friction range with respect to the zero-force direction.

15. The gear transmission of claim 1, comprising two concentric gear wheels in the input body rigidly attached to each other and two concentric gear wheels in the output body rigidly attached to each, and a gear wheel that is non-concentric with both the two gear wheels of the input body and the two gear wheels of the output body connecting the two concentric gear wheels in the input body and the two concentric gear wheels in the output body.

16. The gear transmission of claim 1, comprising a decreasing gear ratio in the input body and an increasing gear ratio in the output body so that the gear transmission as a whole is a reduction gear.

17. A power transmission apparatus comprising the gear transmission of claim 1.

18. The gear transmission of claim 1, wherein the input part is extended such that the input part not only defines the input axis but also comprises a set of gear wheels.

19. The gear transmission of claim 18, wherein the output body is configured to receive energy via two different routes, the first route being provided by rotation of the input axis and the second route being provided by rotation of the extended input part being directly coupled to rotation of the output body.

20. The gear transmission of claim 19, wherein the extended input part is coupled by a rotational coupler to the output body, the rotational coupler comprising a locking feature so that when the output part or axis rotates and there is no power incoming through the input part or axis, the input and output bodies rotate at same angular velocity.

* * * * *